US010858929B2

(12) United States Patent
Estes et al.

(10) Patent No.: US 10,858,929 B2
(45) Date of Patent: Dec. 8, 2020

(54) METHODS FOR DRILLING MULTIPLE PARALLEL WELLS WITH PASSIVE MAGNETIC RANGING

(71) Applicants: Robert A. Estes, Tomball, TX (US); Catalina Leal, Spring, TX (US)

(72) Inventors: Robert A. Estes, Tomball, TX (US); Catalina Leal, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/352,885

(22) Filed: Nov. 16, 2016

(65) Prior Publication Data

US 2017/0138173 A1     May 18, 2017

Related U.S. Application Data

(60) Provisional application No. 62/255,924, filed on Nov. 16, 2015.

(51) Int. Cl.
*E21B 47/022*     (2012.01)
*E21B 7/04*     (2006.01)
(Continued)

(52) U.S. Cl.
CPC ............. *E21B 47/022* (2013.01); *E21B 7/04* (2013.01); *E21B 43/2406* (2013.01);
(Continued)

(58) Field of Classification Search
CPC .......... E21B 47/022; E21B 47/18; E21B 7/04; E21B 43/2406
See application file for complete search history.

(56) References Cited

U.S. PATENT DOCUMENTS

| 6,991,045 B2 * | 1/2006 | Vinegar | B09C 1/02 |
| | | | 166/66.5 |
| 2006/0124360 A1 * | 6/2006 | Lee | E21B 43/305 |
| | | | 175/61 |

(Continued)

FOREIGN PATENT DOCUMENTS

| EP | 2039085 A2 | 3/2009 |
| EP | 2039085 B1 | 11/2012 |

(Continued)

OTHER PUBLICATIONS

Hanak et al.; "High Speed, Continuous Single Well Magnetic Ranging," SPE/IADC-173135-MS, This paper was prepared for presentation at the SPE/IADC Drilling Conference and Exhibition held in London, United Kingdom, Mar. 17-19, 2015, pp. 1-17.

(Continued)

*Primary Examiner* — David J Bagnell
*Assistant Examiner* — Dany E Akakpo
(74) *Attorney, Agent, or Firm* — Cantor Colburn LLP

(57) ABSTRACT

A system and method for drilling a second well with respect to a first well is disclosed. A first drill string having a known magnetic signature is disposed at a first depth in the first well. A second drill string is used to drill the second well. The second drill string includes a magnetometer that obtains a magnetic measurement of the first drill string during drilling of the second well. A processor uses the obtained magnetic measurement and the magnetic signature of the first drill string to steer the second drill string to drill the second well.

19 Claims, 12 Drawing Sheets

(51) Int. Cl.
*E21B 43/24* (2006.01)
*G01V 3/26* (2006.01)
*E21B 47/18* (2012.01)
*E21B 47/092* (2012.01)
*E21B 47/024* (2006.01)
*E21B 44/00* (2006.01)

(52) U.S. Cl.
CPC .......... *E21B 47/024* (2013.01); *E21B 47/092* (2020.05); *G01V 3/26* (2013.01); *E21B 44/00* (2013.01); *E21B 47/18* (2013.01)

(56) References Cited

U.S. PATENT DOCUMENTS

| | | | |
|---|---|---|---|
| 2009/0260878 A1* | 10/2009 | Morley | E21B 43/305 175/45 |
| 2011/0079431 A1* | 4/2011 | Clark | E21B 43/30 175/45 |
| 2014/0071895 A1 | 3/2014 | Bane et al. | |
| 2014/0121971 A1* | 5/2014 | Hanak | E21B 47/02216 702/6 |
| 2015/0029881 A1 | 1/2015 | Finlayson | |
| 2016/0273345 A1* | 9/2016 | Donderici | E21B 7/04 |
| 2018/0038984 A1* | 2/2018 | Zhang | G01V 3/26 |

FOREIGN PATENT DOCUMENTS

| | | |
|---|---|---|
| GB | 2499733 A | 8/2013 |
| WO | 2013043308 A1 | 3/2013 |

OTHER PUBLICATIONS

Mercado et al.; "Multilateral Wells in the Castilla Field of Eastern Colombia: A Case History of the Guadalupe Reservoir," SPE/IADC 119458, This paper was prepared for Presentation at the SPE/IADC Drilling Conference and Exhibition held in Amsterdam, The Netherlands, Mar. 17-19, 2009, pp. 1-8.

Mercer et al.; "Infill Drilling Using Horizontal Wells: A Field Development Strategy for Tight Fractured Formations," SPE 17727, This paper was prepared for presentation at the SPE Gas Technology Symposium, Dallas, Texas, Jun. 13-15, 1988, pp. 225-232.

PCT International Search Report; International Application No. PCT/US2016/053860; International Filing Date: Sep. 27, 2016; dated Nov. 30, 2016, pp. 1-4.

PCT Written Opinion; International Application No. PCT/US2016/053860; International Filing Date: Sep. 27, 2016; dated Nov. 30, 2016, pp. 1-11.

* cited by examiner

METHODS FOR DRILLING MULTIPLE PARALLEL WELLS WITH PASSIVE MAGNETIC RANGING

CROSS REFERENCE TO RELATED APPLICATIONS

This application claims priority from U.S. Provisional Application Ser. No. 62/255,924, filed Nov. 16, 2015, the contents of which are incorporated herein by reference in their entirety.

BACKGROUND

The present disclosure relates to directional drilling and, in particular, to a method of determining a location of a well drilled with respect to an offset well using passive magnetic ranging.

Efficient extraction of mineral ores in a deep narrow vein can be obtained by drilling multiple parallel open-hole wells at close spacing. Also, extracting petroleum from a reservoir often involves drilling multiple parallel horizontal wells at fairly close spacings to efficiently stimulate and drain the reservoir. In a simple field development scenario, parallel horizontal wells are planned, drilled and completed with sufficient spacing between them that the adjacent well's steel casing is too far away to interfere with the undisturbed earth's magnetic field in the area for the new well. The new well can then be drilled and guided by conventional directional instruments, relying on accelerometers and magnetometers to steer using earth field references. For closer spacing, parallel wells can be planned, drilled, and completed in a step-out pattern, using passive magnetic ranging to steer the drilling of each new well adjacent to the previous cased well, so that the conundrum of magnetic signals from multiple offset wells does not confuse magnetic measurements that are used to steer the drilling of the wells. Passive magnetic ranging is a process for determining a relative position of a well with respect to an offset well which contains multiple residual magnetic poles. The offset well is cased with magnetic casing tubulars which have magnetic field induced therein. A magnetometer on a drill string drilling the new well detects the magnetic field of the tubulars and uses the magnetic field to determine distance and direction to the offset well, as well as to guide the drill string in drilling the new hole in alignment with the offset well. A number of drilling procedures are performed in open wellbores, i.e., wellbores that do not have a casing. In these instances, the offset well does not provide a magnetic field that can be sensed at the drill string in the new well. There is, therefore, a need to provide a method to guide the drilling of a new wellbore next to an open wellbore that is offset from the new well.

Enhanced Geothermal Systems may employ a closed-loop system of piping which transfers thermal energy by conduction to the pipe, which circulates a fluid for thermal transfer to the surface in a clean, closed loop. Wells drilled to enable such a system are often called "U-Tube Wells", wherein two vertical wells spaced apart are joined deep underground in a horizontal section. When drilling the U-Tube well, guiding the second well to intersect with the first well uses a method for steering toward an open well.

BRIEF DESCRIPTION

In one aspect, a method of drilling a second well with respect to a first well includes: providing a first drill string in the first well, the first drill string having a magnetic signature; drilling the second well using a second drill string that includes a magnetometer; obtaining a magnetic measurement of the first drill string during drilling of the second well using the magnetometer; and steering the second drill string to drill the second well using the obtained magnetic measurement and the magnetic signature of the first drill string.

In another aspect, a system for drilling a second well with respect to a first well includes: a first drill string in the first well, the first drill string having a magnetic signature; a second drill string in the second well, wherein the second drill string includes a magnetometer that obtains a magnetic measurement of the first drill string while the second drill string drills the second well; and a processor that steers the second drill string to drill the second well using the obtained magnetic measurement and the magnetic signature of the first drill string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
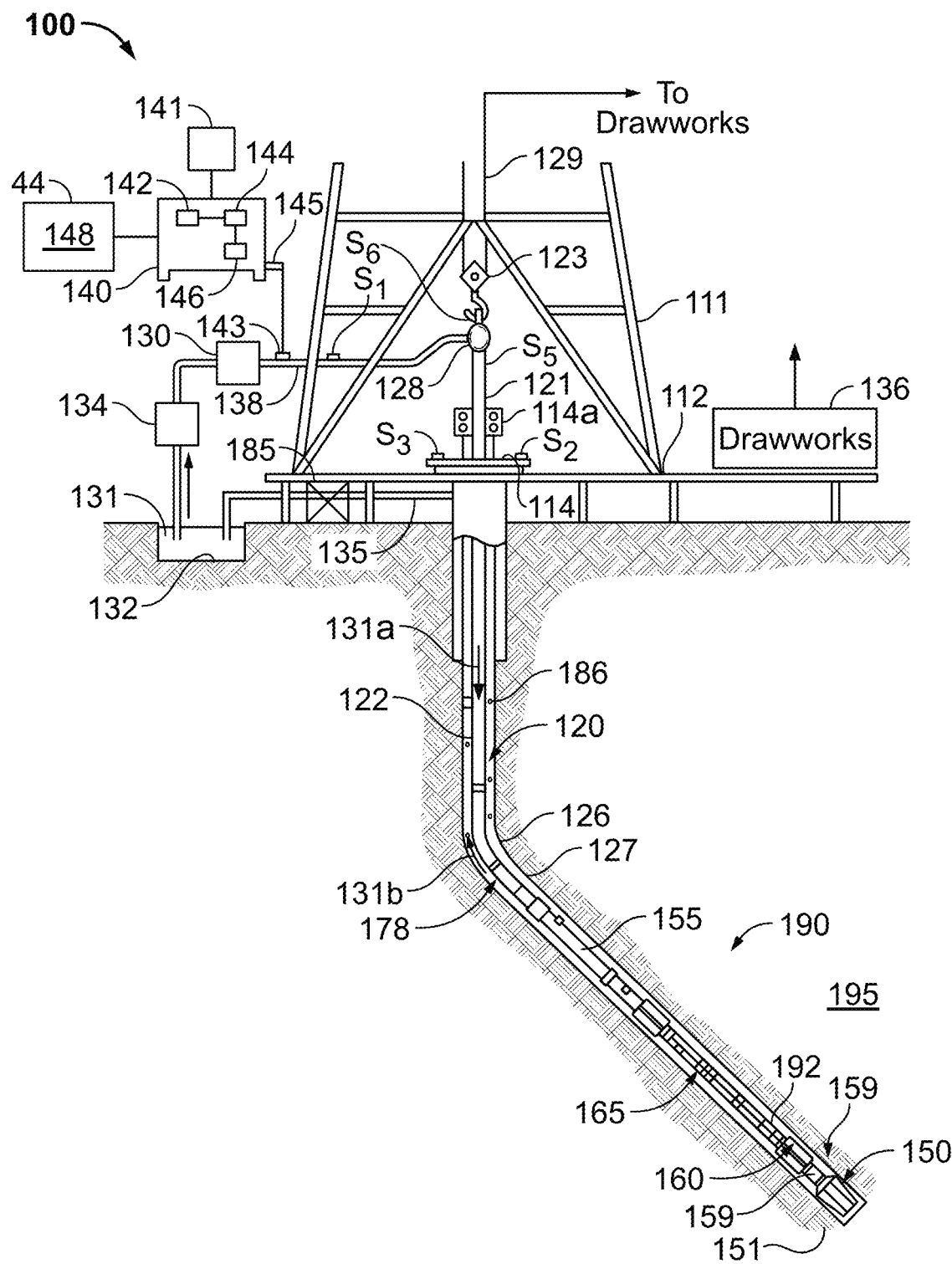
FIG. 1 is a schematic diagram of an exemplary drilling system that includes a drill string having a drilling assembly attached to its bottom end that includes a steering unit according to one embodiment of the disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126, also referred to herein as a well or wellbore. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 is attached at its bottom end extends from the surface to the bottom 151 of the borehole 126. A drill bit 150, attached to drilling assembly 190, disintegrates the geological formations when it is rotated to drill the borehole 126. The drill string 120 is coupled to a draw-works 130 via a Kelly joint 121, swivel 128 and line 129 through a pulley. Draw-works 130 is operated to control the weight on bit ("WOB"). The drill string 120 may be rotated by a top drive (not shown) instead of by the prime mover and the rotary table 114. The operation of the draw-works 130 is known in the art and is thus not described in detail herein.

In one aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole and may control one or more operations of the downhole and surface devices.

The drilling assembly 190 also contains formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such sensors are generally known in the art and for convenience are generally denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

The drilling assembly may further include a magnetometer 192 for measuring a local magnetic field. The magnetometer 192 may be a three-axis magnetometer for obtaining magnetometer measurements along three orthogonal directions. In an exemplary embodiment, one of the orthogonal directions (i.e., the z-direction) is directed along a longitudinal axis of the drill string and the other orthogonal directions (i.e., the x-direction and y-direction) are in a transverse plane of the drill string and extending radially outward from the drill string. In one embodiment, the magnetometer 192 may measure the local magnetic field to obtain a measurement affected by the presence of a magnetic field on an object in a nearby offset well. These measurements may be sent to controller 140 or other suitable processor that uses the measurements to determine a relative distance between the drill string 120 and the offset well. The drilling assembly may further include survey instruments for obtaining survey parameters, such as borehole inclination and azimuth. In one embodiment, the magnetometer 192 is located proximate drill bit 150, thereby improving the relevancy of obtained measurements with respect to the drill bit location and therefore the accuracy of the drill bit location. The estimated relative distance may be with respect to a sensor, a BHA, a drill bit or other suitable location of the drill string.

Still referring to FIG. 1, the drill string 120 further includes energy conversion devices 160 and 178. In an aspect, the energy conversion device 160 is located in the BHA 190 to provide an electrical power or energy, such as current, to sensors 165 and/or communication devices 159. Energy conversion device 178 is located in the drill string 120 tubular, wherein the device provides current to distributed sensors located on the tubular. As depicted, the energy conversion devices 160 and 178 convert or harvest energy from pressure waves of drilling mud which are received by and flow through the drill string 120 and BHA 190. Thus, the energy conversion devices 160 and 178 utilize an active material (e.g., mud) to directly convert the flow of the active material into electrical energy downhole. Pressure pulses downhole can be sent uphole to communicate with a surface controller. Also pressure pulses from the surface can be sent downhole to communicate with downhole processors. As depicted, pressure pulses are generated downhole by a modulator, such as a telemetry communication modulator, and/or as a result of drilling activity and maintenance. Accordingly, the energy conversion devices 160 and 178 provide a direct and continuous source of electrical energy to a plurality of locations downhole without power storage (battery) or an electrical connection to the surface.

Figure 2:
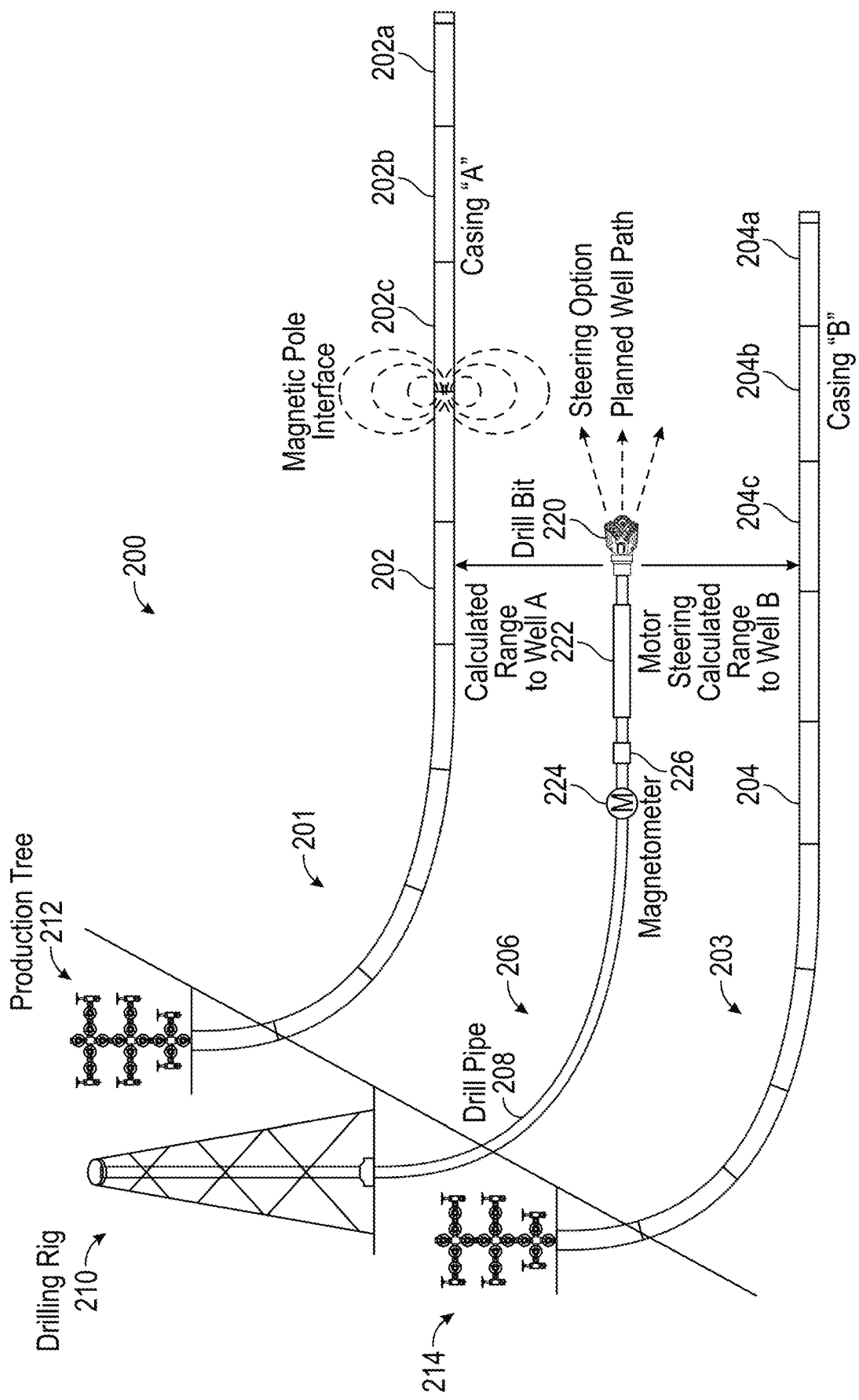
FIG. 2 illustrates a drilling system for in-fill drilling that employs ranging from magnetic interference patterns from two offset wells, in one embodiment of the present invention.

FIG. 2 illustrates a drilling system 200 for in-fill drilling that employs ranging from magnetic interference patterns from two offset wells, in one embodiment of the present invention. Offset borehole 201 is a horizontal borehole that includes casing string (Casing A) 202 composed of a plurality of casing tubulars. 202a, 202b, 202c . . . Offset borehole 203 is a horizontal borehole that includes casing string (Casing B) 204 composed of a plurality of casing tubulars. 204a, 204b, 204c . . . Casing B 204 is displaced from Casing A 202 by a known distance and may have been drilled using a range tracking technique (active or passive) based on the magnetic signals from steel Casing A 202. Casing A 202 extends to production tree 212 at a surface location, while Casing B 204 extends to production tree 214 at another surface location. The casing tubulars 202a, 202b and 202c of Casing A 202 have magnetic profiles associated with them. A magnetic profile (also referred to herein as a "magnetic signature") refers to a particular magnetic charge pattern, shape, polarity, number of poles, etc. for an object such as a casing, casing tubular, drill string, drill string tubular, BHA, etc. The magnetic profile of a casing tubular is generally similar, but unique in details to other casing tubulars and therefore distinguishes the casing tubular from the other casing tubulars of its casing string. The casing tubulars 204a, 204b and 204c of Casing B 204 also have magnetic profiles associated with them. Casing A 202 has a magnetic profile based on the magnetic profiles of its casing tubulars 202a, 202b, 202c . . . , their arrangement, order, etc. Similarly, Casing B 204 has a magnetic profile based on the magnetic profiles of its casing tubulars 204a, 204b, 204c . . . , their arrangement, order, etc. The magnetic profile of Casing A 202 is therefore different from the magnetic profile of Casing B 204. In one aspect, the casing tubulars 202a, 202b, 202c . . . can be arranged so that a magnetic pole of one casing tubular interferes with a magnetic pole of its adjacent casing tubular. For example, adjacent casing tubulars can be joined at a joint so that the magnetic pole of one tubular at the joint is the same as the magnetic field of the adjacent tubular at the joint, thereby causing magnetic fields to extend into the formation at the joint. These extending fields can be more easily detected by a magnetometer on a nearby drill string and used in magnetic ranging by the drill string.

Drilling rig 210 is located between production tree 212 and production tree 214 and extends a drill string 208 into a borehole 206 located between the two existing offset wells 201 and 203 in order to drill borehole 206. The drill string 208 includes a drill bit 220 for drilling the borehole 206, a motor and steering assembly 222 for drilling and steering the drill bit 220, and a magnetometer 224 for magnetic ranging of the borehole 206 with respect to Casing A 202 and Casing B 204. In other embodiments, steering assembly 222 may be a rotary steerable system to steer the bit, relying on rotation from the surface to provide torque. In various embodiments, the magnetometer 224 may include various single axis magnetometers aligned along orthogonal directions of a coordination system of the drill string 208. The magnetometers detect distortions in the earth's magnetic field due to the proximity of drill string 208 to casing 202 and 204. A processor 226 receives magnetic measurements from the magnetometer 224, which are distorted due to the proximity of the adjacent casing. The MWD system telemeters the distorted magnetic field data to the surface, where another processor, with knowledge of the depth of the drilling assembly, is continuously computing the ranging measurements. In one embodiment, the surface processor employs a Passive Magnetic Ranging (PMR) method using a trailing Extended Kalman Filter (EKF) optimization window to estimate the position and attitude of the well 206 in 3-dimensional space. The surface processor thereby determines distances and directions from the borehole 206 to Casing A 202 and from borehole 206 to Casing B 204. The surface processor then uses these distances and the confidence factors (or uncertainties) associated with the distances to produce guidance instructions to steer the drill bit 220 along the planned well path. In one embodiment, the surface processor sends a signal to the motor and steering assembly 222 to alter a drilling or steering parameter with respect to the drill bit 220 based on the determined distances.

In one embodiment, the drill string 208 performs magnetic ranging using the magnetic fields from both Casing A 202 and Casing B 204. By performing a ranging navigation analysis on both Casing A 202 and Casing B 204 simultaneously while drilling borehole 206, it is possible to continuously visualize the range and direction (and their uncertainties) to each of the offset wells 201 and 203. The methods disclosed herein add the trajectory and magnetic profile estimate of a second offset well (e.g., Casing B 204) to the standard ranging techniques used to drill parallel to a single first offset well (e.g., Casing A 202). In each of the side-by-side tracking analyses, a continuous estimate for range uncertainty, direction uncertainty and goodness of fit for the predicted and measured magnetic field is computed and displayed. In depth segments where the magnetic field is stronger due to proximity or pole strength, one of the simultaneous analysis cases will be the clear choice to represent the true position of drill string 208. By replicating the tracking analysis against both offset wells 201 and 203 simultaneously and aggregating best-fit results over multiple casing lengths, it is possible to determine the position of the current wellbore 206 against at least one of the offset wells 201 and 203. Once a position with respect to either Casing A 202 or Casing B 204 is determined, the position with respect to the other casing is calculated, given prior knowledge of their displacement from the trajectories of the two offset casing strings.

While drilling the current wellbore 206, the magnetic signals from one of the offset wellbores 201 and 203 will generally be stronger than the other. The uncertainty in position measurements will be greater for measurements of the offset well that has a weaker magnetic field at the magnetometer 224. However, the position of the drill string 208 can still be known adequately to enforce anti-collision rules for borehole drilling.

Weak casing signals cause little disturbance to the ambient Earth's magnetic field. In one embodiment, the processor 226 can perform conventional magnetic surveys for guidance off of a single offset wellbore. Stronger magnetic signals from the casings 202 and 204, (due to close proximity of one of more offset wells) provide better confidence in the range and direction to the offset well or wells. Because the ranging process is continuous with depth, and because the magnetic poles on the adjacent parallel joints of casing are not correlated with depth, it is possible to distinguish magnetic trends over a selected segment of the wellbore, and therefore to determine a range and direction to each of the offset wells, with a fair degree of confidence. In one embodiment, the drill string 208 splits a difference between offset wells 201 and 203 to guide the drilling of horizontal well 206. In another embodiment, a history of the magnetic fields can be recorded over a selected tracking length. In various embodiments, this tracking length is about 60 meters. In similar fashion, more than two adjacent casing strings can be loaded into the three-dimensional simulation and analysis processor, and tracked continuously in simultaneous algorithms over depth intervals. Where the correlation calculations indicate strong confidence, the position for the active well can be chosen from the available choices accordingly.

Figure 3:
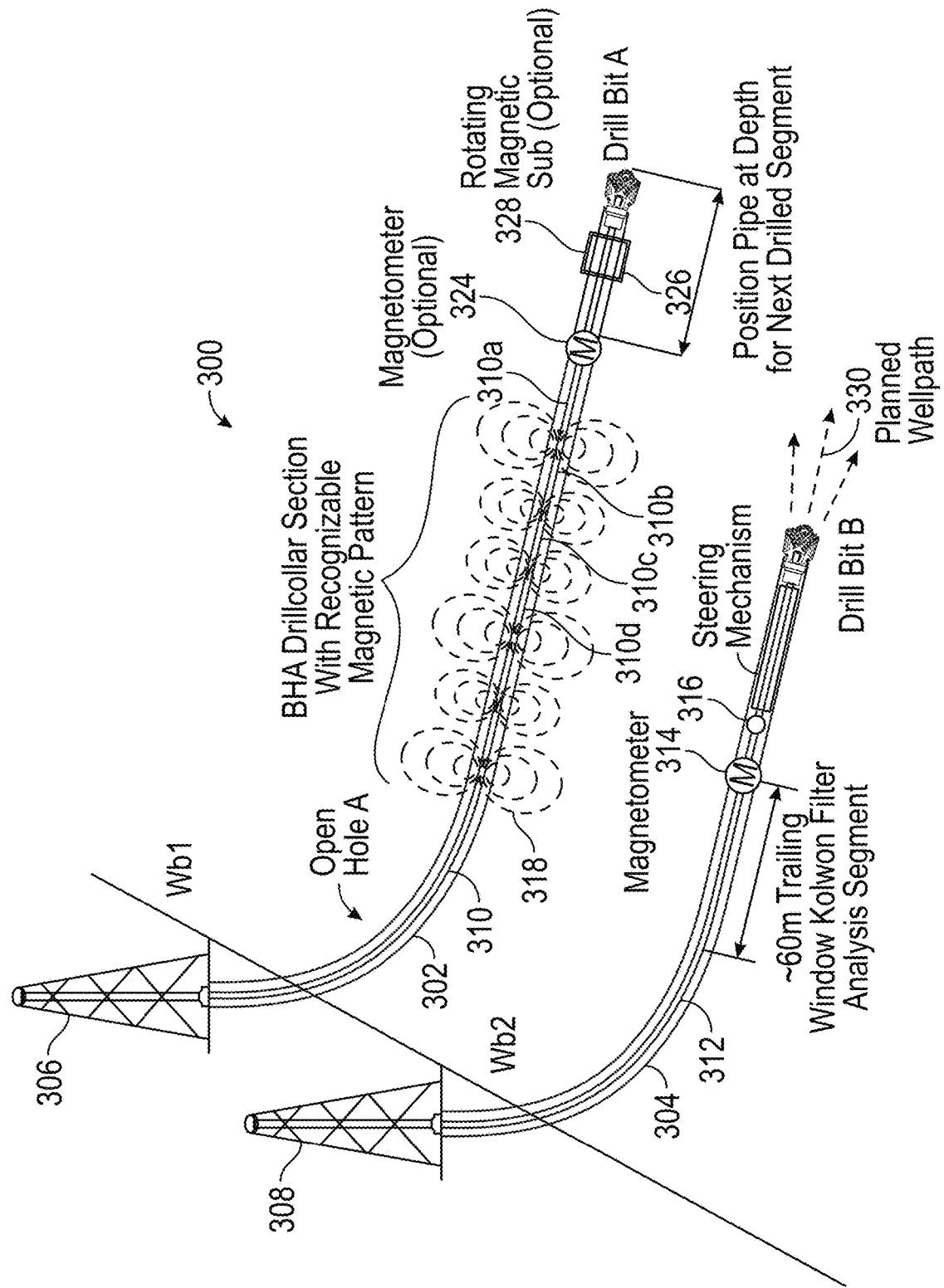
FIG. 3 shows a system for drilling a second wellbore using a first borehole that is an open on non-cased borehole as a guide using passive magnetic tracking.

FIG. 3 shows a system 300 for drilling a second wellbore 304 using a first borehole 302 (also referred to herein as an "offset borehole" or "reference borehole") that is an open on non-cased borehole as a guide using passive magnetic tracking. The second borehole 304 is being drilled alongside the first borehole 302 at a location laterally displaced from the first borehole 302. The two wellbores 302 and 304 are shown in FIG. 3 as being drilled from two separate derricks 306 and 308, respectively, but they may also be drilled using the same rig. First borehole 302 and second borehole 304 are shown as horizontal boreholes for illustrative purposes. However, it is understood that a vertical borehole or boreholes having any angle of deviation can be drilled using the methods disclosed herein. Furthermore, conventional derricks 306 and 308 may alternatively be replaced by horizontal directional drilling slant hole drilling rigs typically used in mining applications.

Drilling a borehole parallel to and closely spaced t an existing open hole borehole using conventional magnetic MWD guidance systems becomes difficult with increasing depth. This is because the borehole trajectories are computed from a series of discrete stations at which only the attitude (inclination and direction angles) and depth are known. Thus, the uncertainty of the location of the well increases with depth. With closely-spaced parallel wells, the cones of uncertainty can overlap at a relatively shallow depth. In order to drill the second well 304 accurately spaced with respect to first well 302, additional information is needed about their positions in space. Passive Magnetic Ranging can be used to supply the additional information needed to accurately position new wells in proximity to existing wells according to a plan.

A drill string ("first drill string") 310 that drills the first wellbore 302 is composed of a plurality of steel tubulars 310a, 310b, 310c, 310d, . . . joined end to end to form the drill string 310. Each tubular 310a, 310b, 310c, 310d, . . . is added to the drill string 310 at a surface location as the drill string 310 descends into the first wellbore 304. Each tubular 310a, 310b, 310c, 310d, . . . has a magnetic field or magnetic charge associated with them. The magnetic charge can be characterized by the strength of the magnetic field on the tubular, the distribution of the magnetic charge on the tubular, the magnetic polarity, etc. The magnetic field or magnetic charge can be a residual magnetic charge imparted to them at the uphole location, either through an intended magnetization process or via an incidental magnetization. The residual charge may be measured or estimated at the uphole location and the measurements stored in a memory location such as storage device 144 (FIG. 1). As the tubulars 310a, 310b, 310c, 310d, . . . are added to the drill string 310, the order of the tubulars 310a, 310b, 310c, 310d, . . . and their locations along the drill string 310 can be also stored in the memory location. Thus, a profile of the magnetic field produced by the drill string 310 (the "magnetic profile") is obtained. The magnetic profile may be stored at a memory location and then used to guide the drilling of subsequent wells using the methods disclosed herein. In one embodiment, all of the tubulars 310a, 310b, 310c, 310d . . . are magnetically charged. In another embodiment, the offset drill string 310 may constructed so that only one or a few tubulars have a significant magnetic charge. Since the magnetic field emanating from a steel tubular is stronger for larger diameter tubulars, and since these are commonly deployed near the bit in the bottom hole assembly (BHA) portion of the drill string, it may be that the "magnetic profile" of interest is located within one or more tubular sections of the BHA near the bit.

In one embodiment, the first wellbore 302 is an open borehole with no casing. Therefore, the first wellbore 302 has no magnetic field except for the magnetic field provided by the drill string 310. After drilling first borehole 302, drill string 310 can be left in first wellbore 302 temporarily for the purposes of providing an offset well for ranging, after which the drill string 310 can be moved. Drill string ("second drill string") 312 in the second wellbore 304 can then use the magnetic profile of the drill string 310 for magnetic ranging to drill the second wellbore 304. As opposed to active magnetic ranging, in which an alternating magnetic field is produced by rotating the magnetic field (mechanically or electrically), with PMR there is no need to rotate the offset drill string in order to detect the magnetic profile. Furthermore, because the radial distribution of the magnetic field at the pole locations is generally symmetrical, rotation of drill string 310 does not materially affect the measured magnetic field at drill string 312.

The second borehole 304 is drilled with drill string 312 which includes one or more sensors, such as a magnetometer 314 and survey instruments. Processor 316 or any other suitable processor computes the measured local magnetic fields which are distorted due to the proximity of the adjacent casing. The MWD system telemeters the distorted magnetic field data to the surface, where another processor, with knowledge of the depth of the drilling assembly, is continuously computing the ranging measurements. In one embodiment, the surface processor employs a Passive Magnetic Ranging (PMR) method using a trailing Extended Kalman Filter (EKF) optimization window to determine relative location and/or orientation of the magnetometer 314 with respect to the drill string 310 in first borehole 302 and then uses the determined location and/or orientation to control a rotary steerable system at the bit or orient a top drive in order to drill the well 312 along a selected or planned well path 330. Alternatively, an operator can control and/or orient the top drive to position an adjustable motor and steerable device downhole using the determined location and/or orientation. In operation, the surface processor estimates a charge distribution at the drill string 310 that produces the downhole measurements at magnetometer 312. The estimated charge distribution is then compared to the known charge profile of drill string 310 to determine orientation and location of drill string 312 with respect to drill string 310. In one embodiment the measurements of the magnetic field are maintained to form a record of magnetic field measurements over a selected length trailing behind the magnetometer. Thus a magnetic profile is recorded at the surface processor which then compares the recorded magnetic profile to the known magnetic profile in order to find relative position of the drill string 312 with respect to drill string 310.

In one embodiment, drill string 310 can be placed in the first well 302 and the drill string 312 can drill the second wellbore 304 by measuring magnetic fields from drill string 310 and determining the location between drill string 312 and drill string 310 based on the measured magnetic fields. Once the second wellbore 304 has been drilled to its desired depth, the drill string 310 can be moved within the first wellbore 302 or tripped out of first wellbore 302.

In another embodiment, the first drill string 310 can be placed into the first well 302 at a first depth. The second drill string 312 can then drill the second well 304 to a first selected depth using the magnetic signature of the first drill string 310. The first drill string 310 can then be moved to a second depth in the first wellbore 302 and the second drill string 312 can drill the second wellbore 304 to a second selected depth. When drilling to the second selected depth, the second drill string 312 guides off of the same tubulars of the first drill string 310 that was used to drill to the first depth. Therefore, the magnetic signature measurements obtained by magnetometer 314 while drilling to the first selected depth can be stored and used to verify measurements obtained while drilling to the second selected depth or to otherwise improve the ability of the second drill string 312 to guide off of first drill string 310. Therefore, the first wellbore 310 and the second wellbore 304 can be drilled side-by-side by drilling the first well 302 to a first depth, drilling the second well 304 to a first selected depth, drilling the first well 302 to a second depth, drilling the second wellbore 304 to the second selected depth, etc.

Additionally, the first drill string 310 may include a magnetic sub 328 that produces an identifiable magnetic profile when the magnetic sub 328 is rotating. The second drill string 312 can then perform magnetic ranging with respect to the rotating magnetic sub 328 to drill the second well 304 along a planned well path 330. This method is known in the art as active magnetic ranging with a rotating magnet sub above one drill bit, and a wireline-deployed magnetometer moved to track its progress incrementally in an adjacent cased well.

In another embodiment, both the first drill string 310 and the second drill string 312 can be composed of magnetic drilling tubulars. Thus, the first drill string can obtain magnetic measurements related to a magnetic profile of the second drill string 312 using magnetometer 324. A processor on the first drill string 310 can then use the obtained magnetic measurements to perform ranging of the first drill string 310 with respect to the second drill string 312, which can be used to steer the first drill string 310. Additionally, the first drill string 310 can be tripped out of the first wellbore 310 and used to drill a third well (not shown) using the magnetic signature from the second drill string 312. This pattern of step-out drilling can be continued indefinitely in a leap-frog manner.

Figure 4:
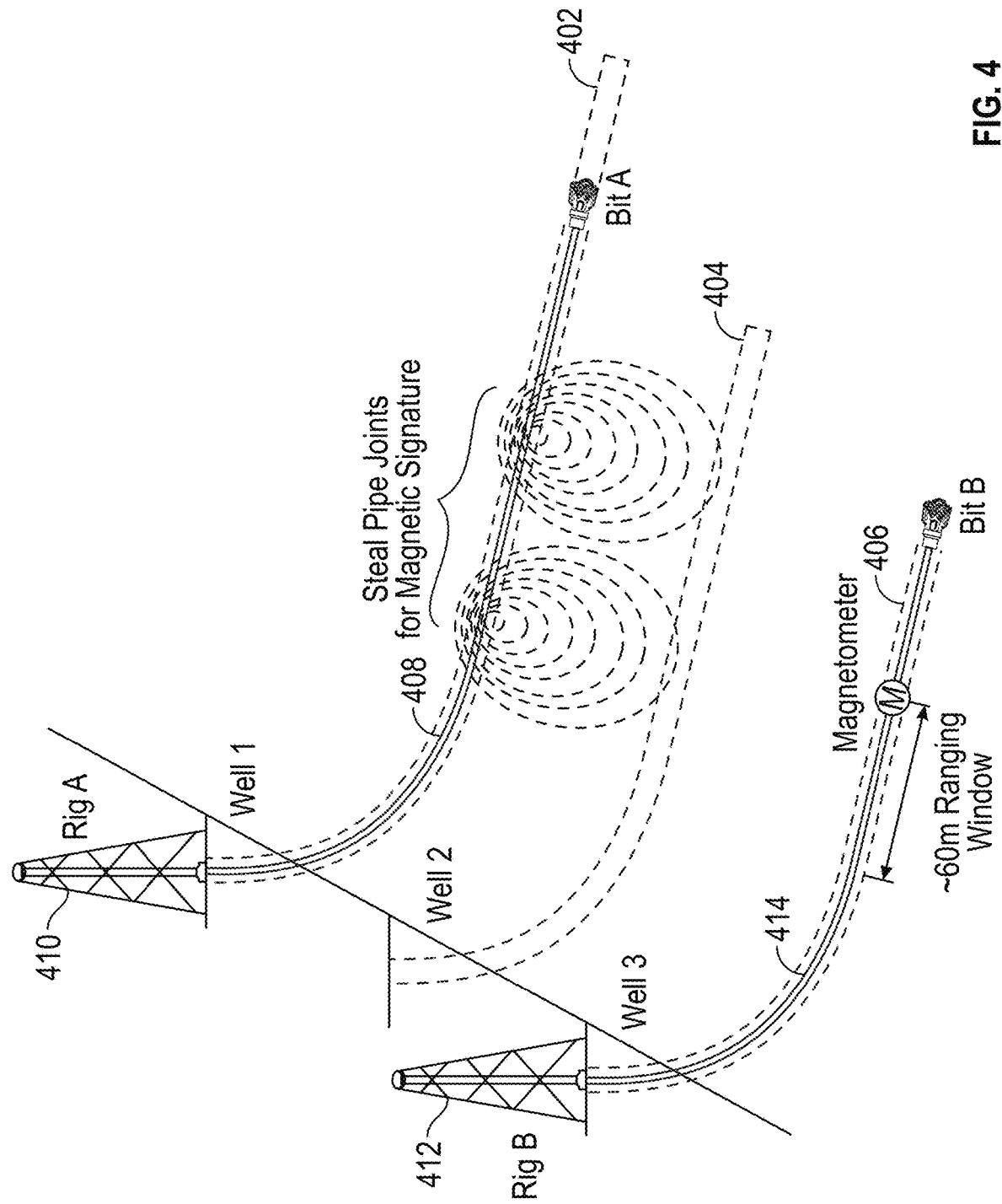
FIG. 4 shows a system for drilling multiple parallel in-fill wells in order to mine ore as drill cuttings from bits drilling multiple parallel wells.

FIG. 4 shows a system for drilling multiple parallel in-fill wells in order to mine ore as drill cuttings from bits drilling multiple parallel wells. In mine ore drilling, wells are drilled for excavation purposes and thus are drilled as close to each other as possible in order to excavate as much of the ore as possible. In FIG. 4, Well 2 (404) is been drilled down to a selected depth with a pilot bit using a rig such as Rig A (410). The drill string is then tripped out of Well 2 (404) and moved over to a next well location Well 1 (402). Well 2 (404) is too close to Well 1 (402) for magnetic ranging, as indicated by the magnetic fields of Well 1 (402). For example, there may not be enough room between Well 2 (404) and Well 1 (402) to allow for side-by-side physical placement of two rigs at the surface associated with Well 2 (404) and Well 1 (402). Also, the magnetic signal from Well 1 (402) may be too strong for reliable magnetic ranging techniques at the close proximity to Well 2 (404) for drilling of Well 2 (404). Therefore, rather than drilling wells sequentially using magnetic ranging, a leap-frog method may be selected. For example, Well 2 (404) can have been drilled previously using a drill string in Well 0 (not shown) Well 3 (406) is drilled alongside Well 2 (404) using the drill string in Well 1 (402). A subsequent Well 4 (not shown) can be drilled alongside Well 3 (406) by placing a drill string in Well 2 (404), and a Well 5 (not shown) can be drilled alongside Well 4 (not shown) by placing a drill string in Well 3 (406). The drill string 408 of Well 1 (402) includes drilling tubulars which provide a magnetic signature that can be used for magnetic ranging. Drill string 414 drills Well 3 (406) using magnetic ranging methods based on the magnetic signature of drill string 408 in Well 1 (402). This leap-frog method can be useful in precious ore mining where wells are drilled so as to be immediately adjacent to one another.

Figure 5:
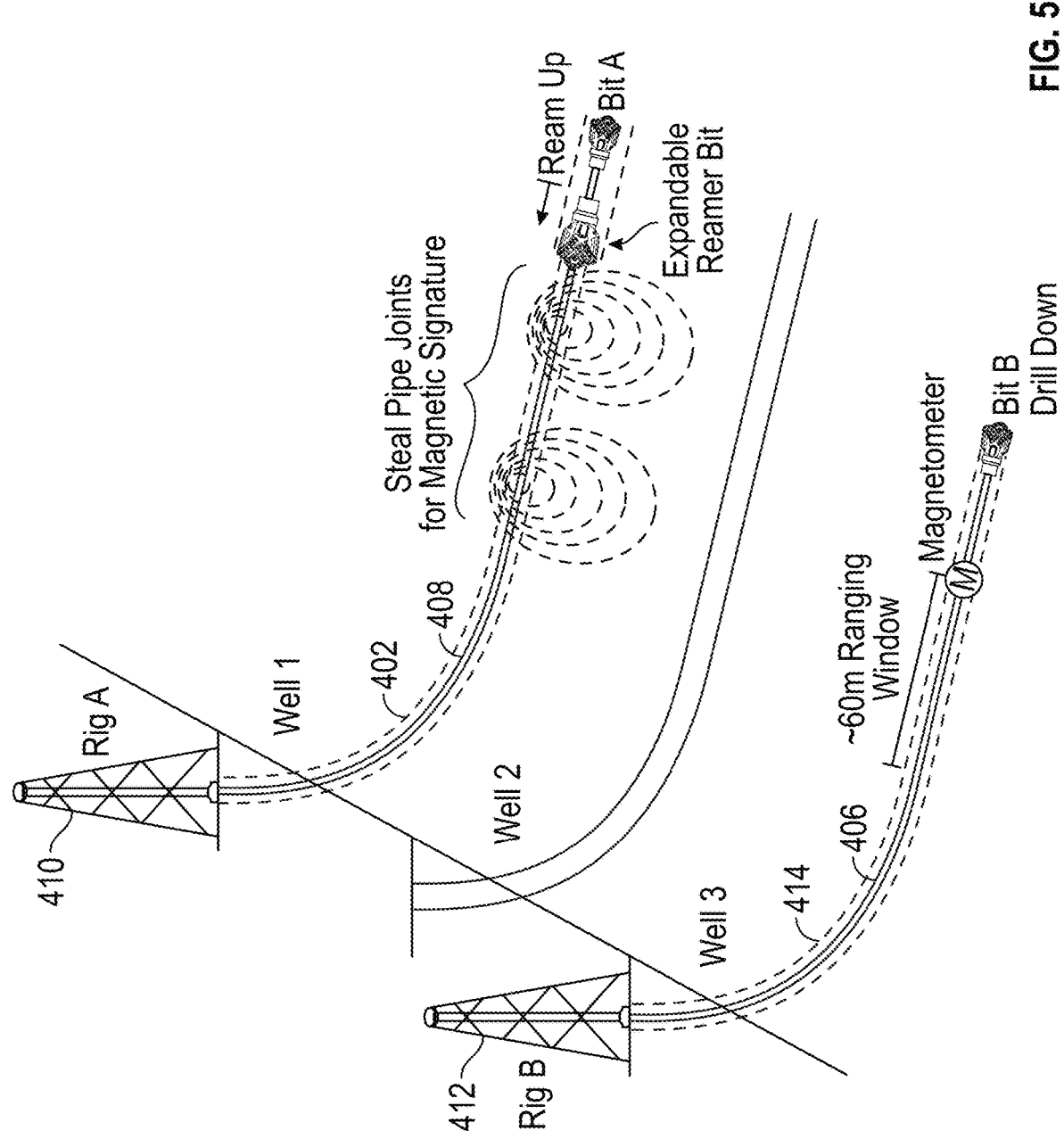
FIG. 5 shows a drill-down ream-up method for ore recovery from a reservoir.

FIG. 5 shows a drill-down ream-up method for ore recovery from a reservoir. Drill string 408 in Well 1 (402) provides a magnetic signature for magnetic ranging of drill string 414 in Well 3 (406). Drill string 408 includes an expandable reamer to enlarge the Well 1 (402) as the drill string 408 is tripped out of the Well 1 (402). In various embodiments, the expandable reamer is a 24-inch reamer and therefore expands the Well 1 (402) to 24 inches in diameter. Therefore, drill string 408 drills downward using the pilot bit (12 inches) and then reams upward using the reamer bit (24 inches). Reaming upward expands an amount of in-situ ore volume that is retrieved into small cuttings that can be used for smelting. As drill string 408 is tripped upward, a computer or processor, generally at the surface, tracks the depth in both Well 1 (402) and Well 3 (406). The processor adjusts the location of the expected magnetic signature of the drill string 408 in Well 1 (402) in order to help guide the drilling of Well 3 (406). The drill string 408 can therefore both ream and provide a magnetic signature for drill string 414, with the reaming and the providing of the magnetic signature occurring simultaneously.

Figure 6:
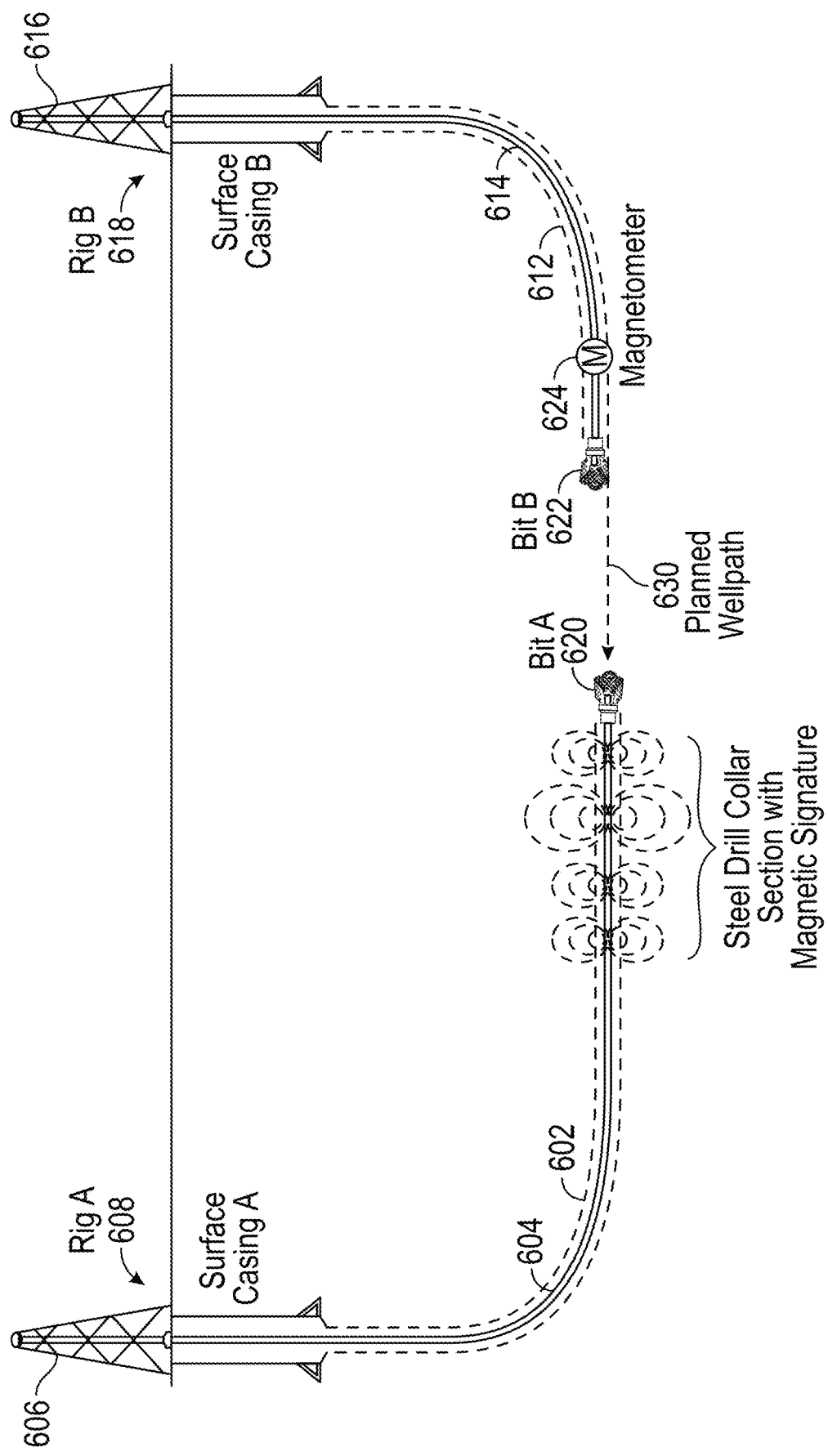
FIG. 6 illustrates a method off drilling a U-tube well using the passive magnetic ranging techniques disclosed herein.

FIG. 6 illustrates a method of drilling a U-tube well using the passive magnetic ranging techniques disclosed herein. The U-tube well is created by drilling a first well 602 using a first drill string 604 extending from a rig 606 at a first location 608. A second well 612 is drilled using a second drill string 614 extending from a rig 616 at a second location 618 separate from the first location 608. The first well 602 and second well 612 are drilled to a selected vertical depth and then turned so as to drill horizontally so that the first well 602 and the second well 612 are approximately at the same depth and are drilled to intersect each other. The intent of this drilling method is to having the second well 612 aligned with the first well 602 and anti-parallel (i.e., parallel but 180° out of alignment) to the first well. The planned path of the second well 612 is such that the second well 612 can be drilled so that drill bit 622 drills directly into drill bit 620, without, of course, causing damage to drill bit 620. Drill bit 620 can be backed off to accommodate drill bit 622. Usually however, the second well 612 is not collinear with the first well 602 due to various difficulties with controlling direction and uncertainty of the precise well positions. Therefore, the second well 612 will end up being drilled to one side of the first well 602. The first drill string 604 includes magnetic tubular sections that provide a magnetic profile that can be measured by a magnetometer 624 of second drill string 614. Additionally, a magnetometer in drill string 604 can use passive magnetic ranging and the magnetic profile from drill string 614 to confirm the well positions.

Figure 7:
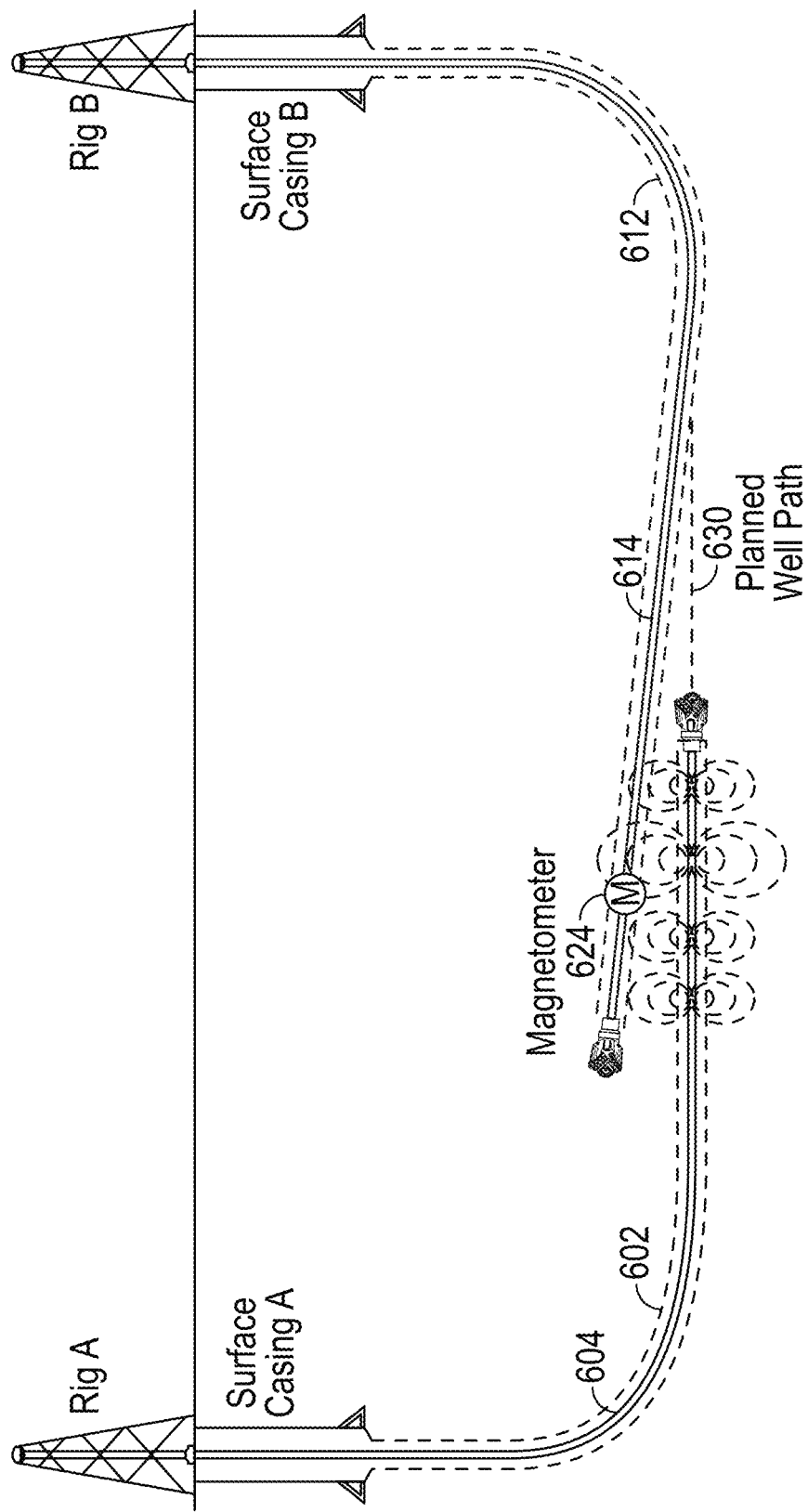
FIG. 7 illustrates a drilling stage of the U-tube well in which the second borehole has been drilled to one side of the first borehole.

FIG. 7 illustrates a drilling stage in which the second borehole 612 has been drilled to one side of the first borehole 602. The magnetometer 624 measures and records the magnetic profile of the first drill string 604 as the second well 612 is drilled alongside the first well 602. The magnetometer measurements can then be used to calculate a range and direction from the drill string 614 to drill string 604. A corrective action can then be determined from the magnetometer measurements to bring the path of the second well 612 back into a desired alignment with the path of the first well 602 alongside planned well path 630.

Figure 8:
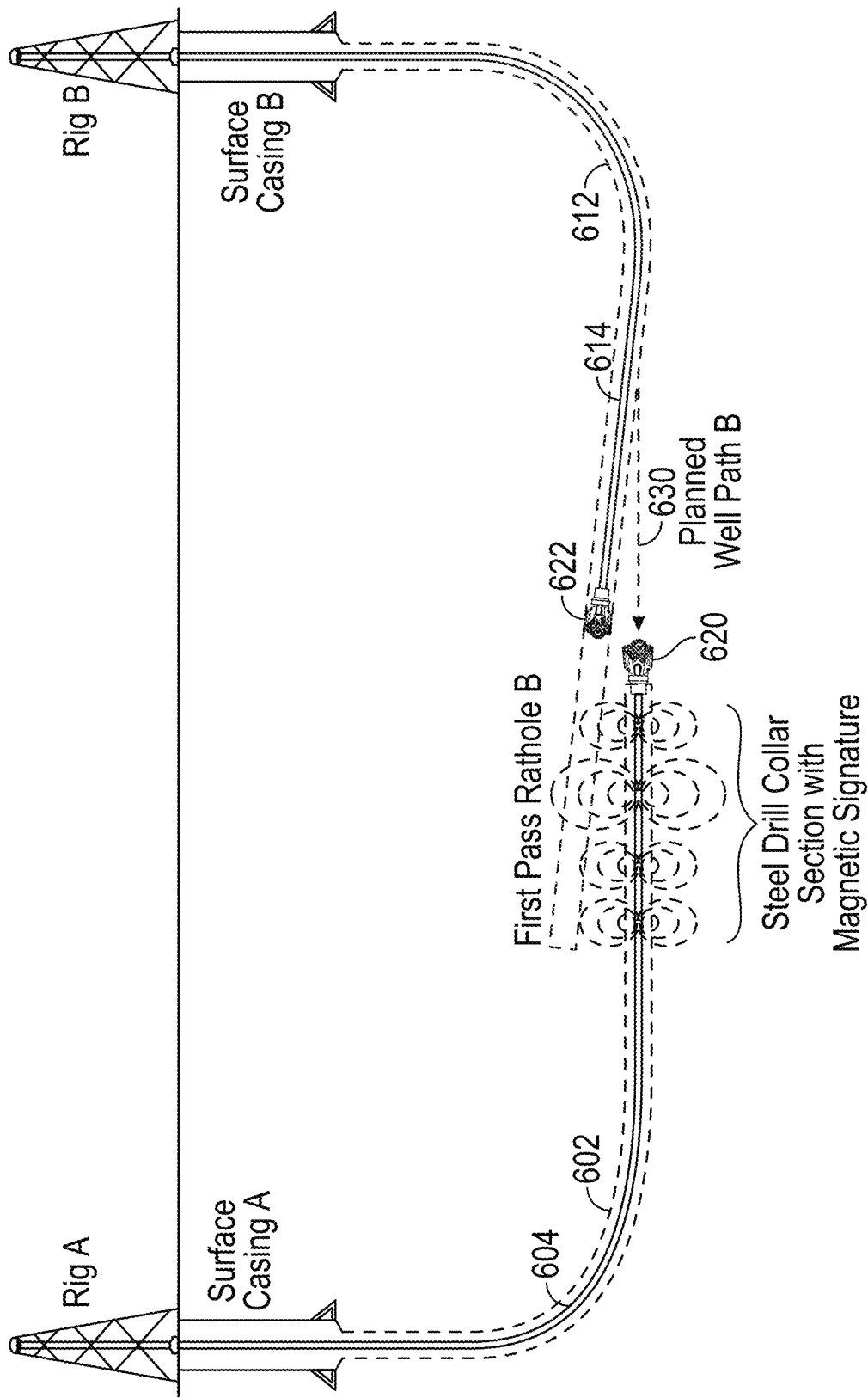
FIGS. 8 and 9 illustrate subsequent drilling stages for completing the U-tube well according to one embodiment.
Figure 9:
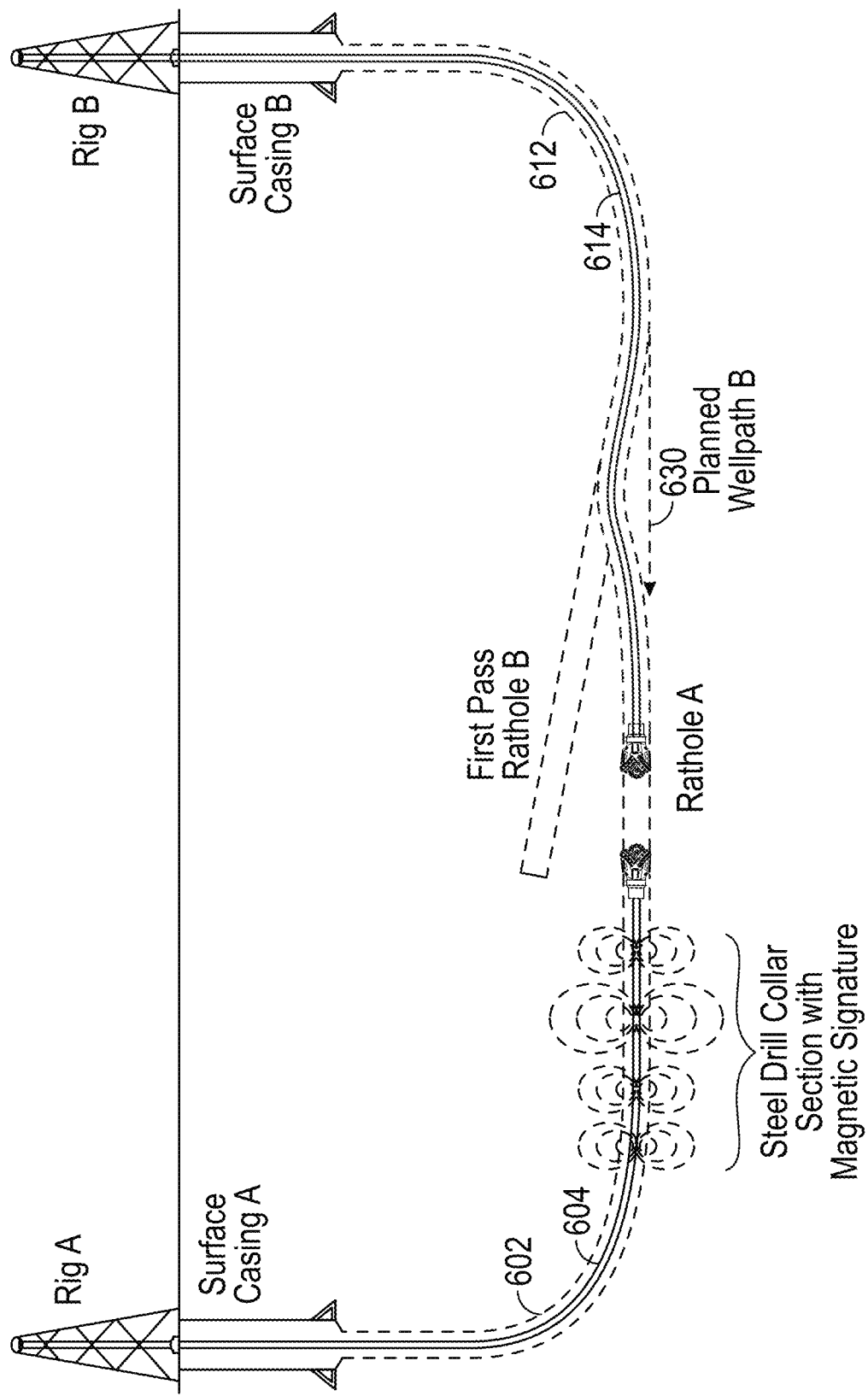

FIGS. 8 and 9 illustrate subsequent drilling stages for completing the U-tube well according to one embodiment. In FIG. 8, once the distance and orientation of the second drill string 614 has been determined with respect to the first drill string 604, the second drill string 614 is tripped up through the second well 612 to a retracted position so that the path of the second drill string 614 at the retracted position is once again collinear with the first well 602. In FIG. 9, the second drill string 614 steers (i.e., sidetracks) the drill bit 622 in order to drill along the planned well path 630. The first drill string 604 has been retracted into the first borehole 602 so that the second drill string 614 will not collide with the first drill string 604 when it enters the first borehole 602.

Figure 10:
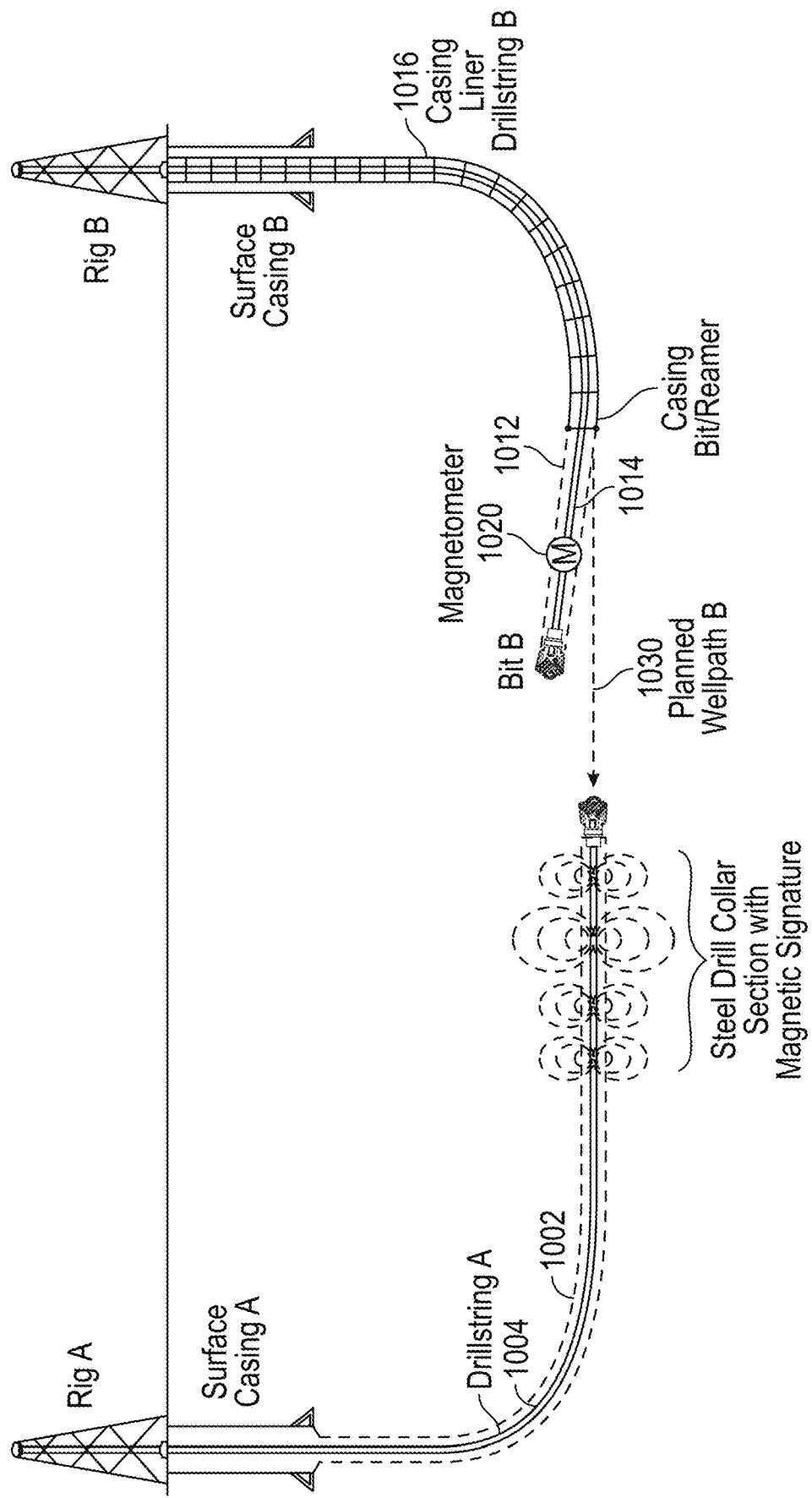
FIGS. 10-12 illustrate various stages for drilling a U-tube well in accordance with another embodiment.
Figure 11:
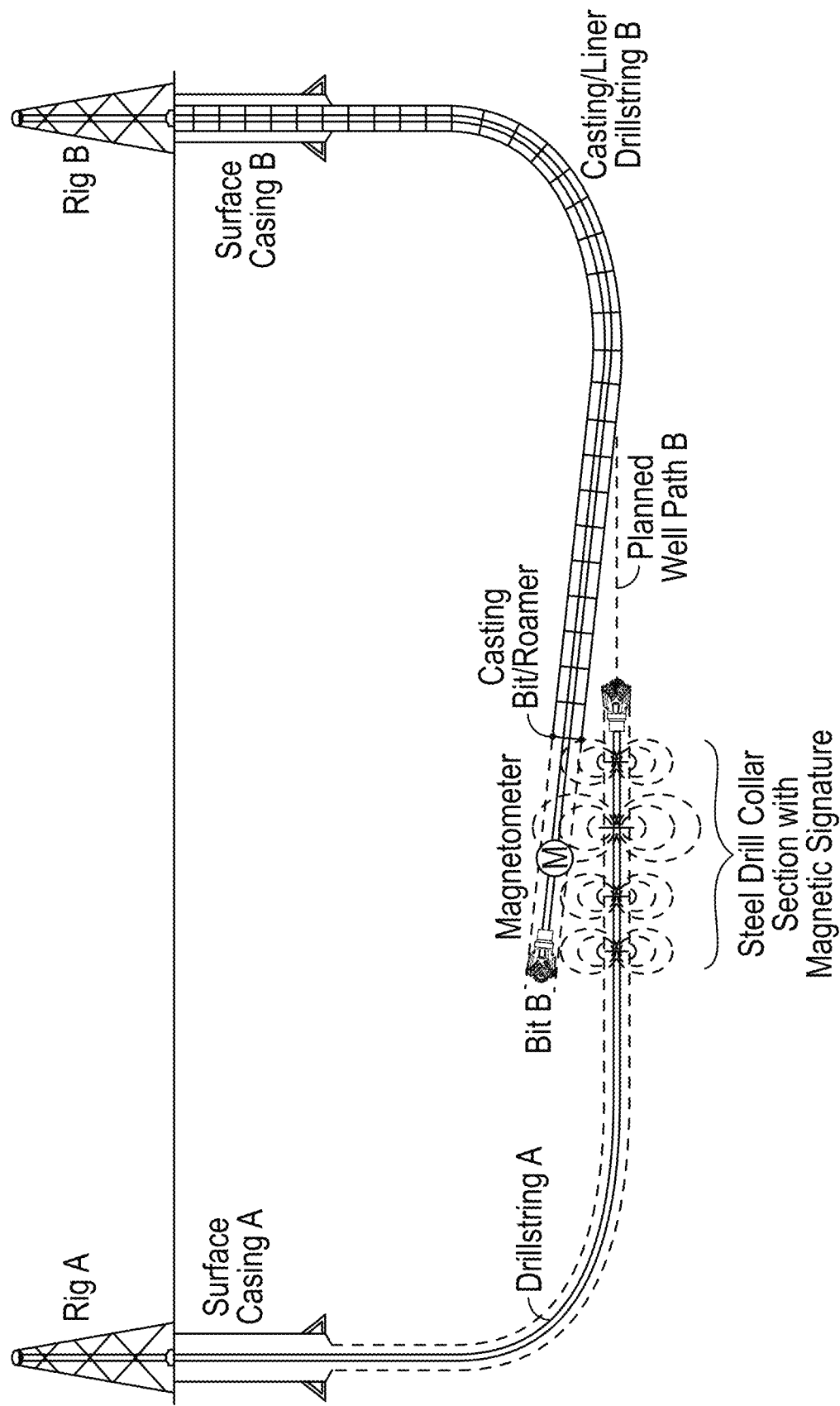
Figure 12:
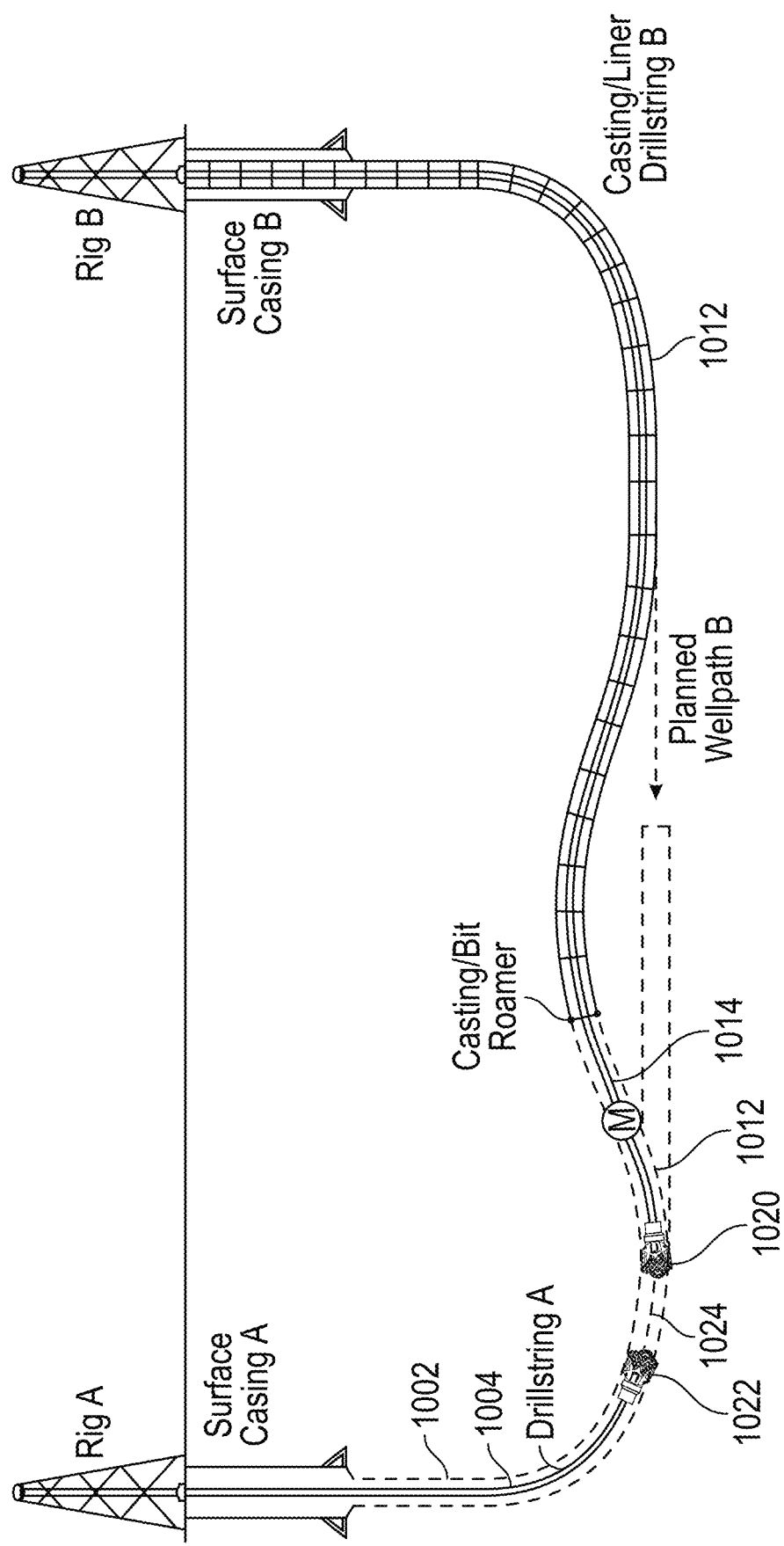

FIGS. 10-12 illustrate various stages for drilling a U-tube well in accordance with another embodiment. Drill string 1004 drills the first well 1002 to a selected vertical depth and then proceeds to drill the first well 1002 horizontally. Drill string 1014 drills second well 1012 to the selected depth and then proceeds to drill the second well 1012 horizontally along a planned well path 1030 that is anti-parallel and collinear with the horizontal section of first well 1002. The second drill string 1014 is a casing/liner drill string that builds or drills in a casing 1016 in the second well 1012 while drilling the second well 1012. Second drill string 1014 further includes a magnetometer 1020 for detecting, among other things, the magnetic field of the drilling tubulars of first drill string 1004. In FIG. 10, drill string 1014 has begun to deviate from the planned well path.

In FIG. 11, drill string 1014 drills alongside first well 1002 due to the deviation from the planned well path 1030 that is illustrated in FIG. 10. The magnetometer 1020 of the second drill string 1014 measures the magnetic field of the drilling tubulars of the first drill string 1004 as the second drill string 1014 drills alongside the first drill string 1004. The measured magnetic fields are then used to calculate the range between first well 1002 and second well 1012.

In FIG. 12, the second drill string 1014 has used the calculated range in order to steer the second drill string 1014 into the first well 1002 from a side of the first well 1002. Because the casing is deployed as the well 1012 is drilled, drill string 1014 cannot be retracted back up the second well 1012 to optimize the intersection path during drilling corrections. It must drill forward and effect the intersection with first well 1002, keeping deviations in the trajectory to a minimum. In one embodiment, a mechanical coupling device such as a latch 1024, which can be a swiveling latch, can be used to attach the drill bit 1020 of the first drill string 1004 to the drill bit 1022 of the second drill string 1014. Therefore, the first drill string can be used to pull the second drill string 1014 through the first well 1002 as the first drill string trips out of the first well 1002. This allows the second drill string 1014 to complete a casing and lining operation over the entire U-type well, using a single continuous casing string. This method avoids a casing joining operations at deep, inaccessible points and provides a smooth, continuous inside diameter for traversal by a heat transfer medium fluid. Heat transfer medium fluid may include liquids or gases, including but not limited to water, steam, and carbon dioxide.

In various embodiments, offset wells used in the magnetic ranging methods disclosed herein need not be horizontal. Rather the offset wells can be vertical or have any other inclination, just so that they are approximately parallel to a planned well. In other embodiments, infill well plans do not need to be centered to "split the difference" between existing wells and can be planned so that wells are as close as about 1 meter and distributed in a step-out pattern. More than two adjacent wells could also be initialized in three-dimensional space and analyzed simultaneously as depth progresses.

The methods disclosed herein therefore provide setup and operation of two or more continuous Passive Magnetic Ranging tasks simultaneously against two or more adjacent parallel wells. These methods enable closer spacing for initial field development of "manufactured horizontal wells" in Steam Assisted Gravity Drainage (SAGD) or shale plays, and allow infill wells to be drilled that previously would require gyroscopic guidance.

Therefore in one aspect, the present invention provides a method of drilling a second well with respect to a first well. The method includes: providing a first drill string in the first well, the first drill string having a magnetic signature; drilling the second well using a second drill string that includes a magnetometer; obtaining a magnetic measurement of the first drill string during drilling of the second well using the magnetometer; and steering the second drill string to drill the second well using the obtained magnetic measurement and the magnetic signature of the first drill string. A distance determined between the first well and the second well and confidence factors associated with the distance may be used to produce a guidance instruction for steering the second drill string along a planned well path. In one embodiment, the first drill string is removed from the first well after drilling the second well. In another embodiment, first drill string is moved within the first well while the second drill string obtains the magnetic measurement of the first drill string and drills the second well. In yet another embodiment, the method includes drilling the second well when the first drill string is at a first depth in the first well, moving the first drill string from the first depth to a second depth in the first well while the second drill string is not drilling, and resuming drilling the second well when the first drill string is at the second depth in the first well. The second drill string can be steered along a planned path using passive magnetic ranging. In one embodiment, a third well is located between the first well and the second well. The second well can be drilled so as to be aligned with the first well and drilled anti-parallel to the first well in order to intersect the first well. In this drilling configuration, the first drill string can be attached to the second drill string and the second drill string can be pulled through the first well via the first drill string. In various embodiments, the first drill string also includes a magnetometer in order to measure a magnetic signature of the second drill string.

In another aspect, the present invention provides a system for drilling a second well with respect to a first well. The system includes a first drill string in the first well, the first drill string having a magnetic signature; a second drill string in the second well, wherein the second drill string includes a magnetometer that obtains a magnetic measurement of the first drill string while the second drill string drills the second well; and a processor that steer the second drill string to drill the second well using the obtained magnetic measurement and the magnetic signature of the first drill string. The processor uses a distance determined between the first well and the second well and confidence factors associated with the distance to produce a guidance instruction for steering the second drill string along a planned well path. In one embodiment, the first drill string is removable from the first well after the second well has been drilled. In another embodiment, the first drill string moves within the first well while the second drill string obtains the magnetic measurement of the first drill string and drills the second well. In another embodiment, the second drill string drills the second well with the first drill string at a first depth in the first well, refrains from drilling while the first drill string is moved from the first depth to a second depth in the first well, and resumes drilling of the second well with the first drill string at the second depth in the first well. The processor steers the second drill string along a planned path using passive magnetic ranging. The system of claim 11, wherein a third well is located between the first well and the second well. In one embodiment, the second well is aligned with the first well and drilled anti-parallel to the first well to intersect the first well. The second drill string may include a mechanical coupling device for attaching the second drill string to the first drill string to allow the first drill string to pull the second drill string through the first well. In one embodiment, the first drill string includes a magnetometer that measures a magnetic signature of the second drill string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of drilling a third well with respect to a first well and a second well, comprising:
    disposing a first residual magnetic signature along a portion of a tubular string in the first well;
    disposing a second residual magnetic signature along a portion of a tubular string in the second well;
    drilling the third well using a drill string that includes a magnetometer;
    performing, while drilling, a first ranging navigation analysis with respect to magnetometer measurements of the first residual magnetic signature and a second ranging navigation analysis with respect to magnetometer measurements of the second residual magnetic signature, the first ranging navigation analysis having a first uncertainty and the second ranging navigation analysis having a second uncertainty;
    selecting one of the first ranging navigation analysis and the second ranging navigation analysis based on a comparison of the first uncertainty and the second uncertainty; and
    steering the drill string to drill the third well using the selected ranging navigation analysis.

2. The method of claim 1, further comprising wherein the first uncertainty and the second uncertainty are at least one of a range uncertainty and a direction uncertainty.

3. The method of claim 1, further comprising performing the first ranging navigation analysis and the second ranging navigation analysis continuously with depth.

4. The method of claim 1, further comprising moving at least one of the first residual magnetic signature within the first well and the second residual magnetic signature within the second well while the drill string obtains the magnetic measurement of the at least one of the first residual magnetic signature and second residual magnetic signature and drills the third well.

5. The method of claim 1, further comprising drilling the third well when the first residual magnetic signature is at a first depth in the first well, moving the first residual magnetic signature from the first depth to a second depth in the first well while the third drill string is not drilling, and resuming drilling the third well when the first residual magnetic signature is at the second depth in the first well.

6. The method of claim 1, further comprising steering the drill string along a planned path using passive magnetic ranging.

7. The method of claim 1, wherein the third well is located between the first well and the second well.

8. The method of claim 1, further comprising using a trailing Extended Kalman Filter optimization window to estimate a position and attitude of the third well in three-dimensional space.

9. The method of claim 8, further comprising measuring a magnetic signature of the drill string at a magnetometer in the first well.

10. The method of claim 1, wherein the first residual magnetic signature is provided by an offset drill string in the first well, further comprising drilling the third well based on the first magnetic signature, removing the offset drill string from the first well and placing the offset drill string in the third well, and drilling a subsequent well based on the first residual magnetic signature provided by the offset drill string in the third well.

11. A system for drilling a third well with respect to a first well and a second well, comprising:
    a first residual magnetic signature along a portion of a tubular string in the first well;
    a second residual magnetic signature along a portion of a tubular string in the second well;
    a drill string in the third well, wherein the drill string includes a magnetometer that obtains a magnetic measurement of the first residual magnetic signature and a magnetic measurement of the second residual magnetic signature while the drill string drills the third well; and
    a processor configured to:
        perform a first ranging navigation analysis with respect to magnetometer measurements of the first residual magnetic signature and a second ranging navigation analysis with respect to magnetometer measurements of the second residual magnetic signature, the first ranging navigation analysis having a first uncertainty and the second ranging navigation analysis having a second uncertainty;
        select one of the first ranging navigation analysis and the second ranging navigation analysis based on a comparison of the first uncertainty and the second uncertainty; and
        steer the drill string to drill the third well using the selected ranging navigation analysis.

12. The system of claim 11, wherein the first uncertainty and the second uncertainty are at least one of a range uncertainty and a direction uncertainty.

13. The system of claim 11, wherein the processor further performs the first ranging navigation analysis and the second ranging navigation analysis continuously with depth.

14. The system of claim 11, wherein the at least one of the first residual magnetic signature moves within the first well and the second residual magnetic signature moves within the second well while the drill string obtains the magnetic measurement of the at least one of the first residual magnetic signature and the second residual magnetic signature and drills the third well.

15. The system of claim 11, wherein the drill string drills the third well with the first residual magnetic signature at a first depth in the first well, refrains from drilling while the first residual magnetic signature is moved from the first depth to a second depth in the first well, and resumes drilling of the third well with the first residual magnetic signature at the second depth in the first well.

16. The system of claim 11, wherein the processor steers the drill string along a planned path using passive magnetic ranging.

17. The system of claim 11, wherein the third well is located between the first well and the second well.

18. The system of claim 11, wherein the processor uses a trailing Extended Kalman Filter optimization window to estimate a position and attitude of the third well in three-dimensional space.

19. The system of claim 11, wherein the first well includes a magnetometer that measures a magnetic signature of the drill string.

\* \* \* \* \*